(12) United States Patent
Franzreb et al.

(10) Patent No.: US 11,047,960 B2
(45) Date of Patent: Jun. 29, 2021

(54) SENSOR AND METHOD FOR DISTANCE MEASUREMENT

(71) Applicant: SICK AG, Waldkirch (DE)

(72) Inventors: Simon Franzreb, Waldkirch (DE); Fabian Jachmann, Waldkirch (DE)

(73) Assignee: SICK AG, Waldkirch (DE)

( * ) Notice: Subject to any disclaimer, the term of this patent is extended or adjusted under 35 U.S.C. 154(b) by 439 days.

(21) Appl. No.: 15/483,290

(22) Filed: Apr. 10, 2017

(65) Prior Publication Data

US 2017/0293021 A1 Oct. 12, 2017

(30) Foreign Application Priority Data

Apr. 12, 2016 (EP) .................................. 16164822

(51) Int. Cl.
| | |
|---|---|
| *G01S 7/48* | (2006.01) |
| *G01S 7/4861* | (2020.01) |
| *G01S 17/42* | (2006.01) |
| *G01S 17/26* | (2020.01) |
| *G01S 7/481* | (2006.01) |
| *G01S 7/4865* | (2020.01) |
| *G01S 17/10* | (2020.01) |

(52) U.S. Cl.
CPC .......... *G01S 7/4861* (2013.01); *G01S 7/4817* (2013.01); *G01S 7/4865* (2013.01); *G01S 17/10* (2013.01); *G01S 17/26* (2020.01); *G01S 17/42* (2013.01)

(58) Field of Classification Search
CPC ................................ G01S 7/483; G01S 7/4865
USPC ................................................ 356/3.01–5.15
See application file for complete search history.

(56) References Cited

U.S. PATENT DOCUMENTS

| | | | |
|---|---|---|---|
| 7,982,861 B2 * | 7/2011 | Abshire | G01S 17/10 356/5.11 |
| 8,767,189 B2 * | 7/2014 | Mase | G01S 7/4863 257/225 |

(Continued)

FOREIGN PATENT DOCUMENTS

| | | |
|---|---|---|
| DE | 4340756 A1 | 6/1994 |
| DE | 19757849 B4 | 12/2004 |

(Continued)

OTHER PUBLICATIONS

European search report dated Oct. 10, 2016 for corresponding EP application 16164822.5.

*Primary Examiner* — Luke D Ratcliffe
(74) *Attorney, Agent, or Firm* — Nath, Goldberg & Meyer; Jerald L. Meyer (57) ABSTRACT

A distance-measuring optoelectronic sensor (10) uses two sampling memories for detection of objects in a monitoring zone (20). The sensor (10) has a light transmitter (12) for transmitting a transmission light pulse (16) into the monitoring area (20), a light receiver (26) for generating a reception signal from the light pulse (22) remitted by objects in the monitoring area (20), a control and evaluation unit (32) configured to determine a reception point in time from the reception signal and the distance of the object by means of a light time of flight method, and a first and second sampling memory (34*a*, 34*b*) having a plurality of memory cells each for storing a section of the reception signal. Partially overlapping recording regions are used, with each alternately recording a reception signal for a longer duration than a time interval between two successive transmission light pulses (16).

16 Claims, 3 Drawing Sheets

(56) References Cited

U.S. PATENT DOCUMENTS

| | | | | |
|---|---|---|---|---|
| 2007/0241955 A1* | 10/2007 | Brosche | ............... | G01S 7/292 |
| | | | | 342/128 |
| 2007/0255525 A1* | 11/2007 | Lee | ............... | G01S 17/10 |
| | | | | 702/159 |
| 2010/0045965 A1* | 2/2010 | Meneely | ............... | G01S 17/10 |
| | | | | 356/5.01 |
| 2012/0154786 A1* | 6/2012 | Gosch | ............... | G01S 7/4817 |
| | | | | 356/5.01 |
| 2012/0182540 A1* | 7/2012 | Suzuki | ............... | G01S 7/4814 |
| | | | | 356/4.01 |
| 2013/0301030 A1* | 11/2013 | Hulm | ............... | G01S 7/4861 |
| | | | | 356/4.01 |
| 2014/0211194 A1* | 7/2014 | Pacala | ............... | G01S 7/4813 |
| | | | | 356/5.01 |
| 2016/0047904 A1* | 2/2016 | Mellot | ............... | G01S 7/4865 |
| | | | | 356/5.03 |
| 2016/0109575 A1* | 4/2016 | Oggier | ............... | G01S 7/4911 |
| | | | | 356/5.01 |
| 2016/0344967 A1* | 11/2016 | Barnes | ............... | H04N 5/37213 |
| 2017/0115392 A1* | 4/2017 | Mase | ............... | G01S 17/10 |
| 2017/0115393 A1* | 4/2017 | Nagai | ............... | G01S 7/4861 |
| 2017/0234983 A1* | 8/2017 | Mase | ............... | G01C 3/06 |
| | | | | 356/5.01 |
| 2019/0056498 A1* | 2/2019 | Sonn | ............... | G01S 17/107 |

FOREIGN PATENT DOCUMENTS

| | | | |
|---|---|---|---|
| EP | 1972961 | A3 | 11/2008 |
| EP | 2469297 | A1 | 6/2012 |
| WO | 2012084298 | A1 | 6/2012 |

* cited by examiner

SENSOR AND METHOD FOR DISTANCE MEASUREMENT

FIELD

The invention relates to a distance-measuring optoelectronic sensor and a method for detecting and determining the distance of objects.

BACKGROUND

Many optoelectronic sensors operate according to the scanning principle, in which a light beam is transmitted into the monitoring area and the light beam remitted by objects is received again in order to then electronically evaluate the reception signal. By determining the light time of flight, the distance to the scanned object can be measured.

The scan beam can be moved for extending the measuring region, as is done in a laser scanner. There, a light beam generated by a laser periodically sweeps over the monitoring area by means of a deflection unit. In addition to the measured distance information, the angular position of the object is derived from the angular position of the deflection unit, and thus the position of an object is detected in two-dimensional polar coordinates. In most laser scanners, the scanning movement is achieved by a rotary mirror. However, it is also known to rotate the entire measurement head including light transmitters and light receivers, such as described in DE 197 57 849 B4.

Laser scanners are used in safety technology for monitoring a source of danger like a dangerous machine. A safety laser scanner is known from DE 43 40 756 A1. A protection field which must not be entered by personnel during operation of the machine is monitored. In case the laser scanner detects an inadmissible intrusion into the protection field, such as a leg of an operator, it triggers an emergency stop of the machine.

Other intrusions into the protection field, such as by static machine parts, can be taught in advance as permissible. Often, warning fields are arranged in front of the protection fields, where an intrusion initially only results in a warning in order to prevent the intrusion into the protection field and thus the emergency stop in time, increasing availability of the system. Safety scanners mostly operate pulse-based.

Sensors used in safety technology have to be particularly reliable and thus meet high safety requirements, for example the EN13849 standard for machine safety and the device standard IEC61496 or EN61496 for non-contact protective devices (ESPE). In order to comply with these safety standards, a number of measures are to be taken, such as safe electronic evaluation by means of redundant, diverse electronics, function monitoring or more specifically monitoring of the contamination of optical components, specifically of a front screen, and/or provision of individual test targets having defined reflectance which have to be detected at the respective scan angles.

The distance in a light time of flight method is measured by a pulse method or, alternatively, by a phase measurement not considered in more detail in this context. Within the pulse methods, there is a further distinction between individual pulse methods, which measure a distance from each received transmission pulse, and so-called pulse averaging methods wherein a plurality of individual measurements is commonly evaluated. A pulse averaging method is, for example, disclosed in EP 1 972 961 A1.

The range of a pulse method is not only limited energetically, but also by an unambiguity range. This is the time interval between two transmission pulses, because it cannot be decided for a pulse received at a later point in time whether it is the current pulse from a small distance or a previous pulse from a larger distance. Therefore, the pulse repetition frequency limits the range. There are approaches for compensation by intelligent interpolation, but they have to rely on assumptions for minimal distances or minimal object sizes and are thus not general enough.

EP 1 972 961 A1 which already has been cited above also briefly discusses pulse echoes from a great distance. However, they are regarded as pure interference, and interference suppression by artificial random delays of individual pulse is introduced so that they are eliminated in the accumulated reception signal due to the random component. Thus, EP 1 972 961 does not attempt to measure distances beyond the unambiguity range, but information which could potentially be used to this end is even specifically suppressed.

WO 2012/084298 A1 describes an adaption of the pulse averaging method according to EP 1 972 961 A1 for laser scanners. There is a problem in that the individual measurements to be averaged are carried out during the scanning movement so that an intelligent assignment of the resulting distance value to an angular position must be found. For that reason, at least two histograms are accumulated from individual measurements in an overlapping fashion, i.e. partially in parallel. This relates to the grouping of individual measurements to a respective overall measurement. It does not alter the range of the individual measurement and thus the overall measurement.

SUMMARY

It is therefore an object of the invention to improve the distance measurement according to a pulse averaging method.

This object is satisfied by a distance-measuring optoelectronic sensor for detection and distance-determination of objects in a monitoring zone, the sensor comprising a light transmitter for transmitting a transmission light pulse into the monitoring area, a light receiver for generating a reception signal from the light pulse remitted or reflected by objects in the monitoring area, a control and evaluation unit configured to determine a reception point in time from the reception signal and, from that, the distance of the object by means of a light time of flight method, a first sampling memory having a plurality of memory cells each for storing a section of the reception signal, and at least a second sampling memory having a plurality of memory cells each for storing a section of the reception signal, wherein first sampling memory and second sampling memory have partially overlapping recording regions and are each configured to record a reception signal for a longer duration than a time interval between two successive transmission light pulses.

The object is also satisfied by a method for detection and distance-determination of objects in a monitoring area, the method comprising the steps of transmitting transmission light pulses into the monitoring area, generating a respective reception signal from the light pulses remitted or reflected by objects in the monitoring area, storing sections of the reception signal in a first sampling memory having a plurality of memory cells, storing sections of the reception signal in at least a second sampling memory having a plurality of memory cells, evaluating the reception signal to determine a reception point in time and, from that, the distance of the object by means of a light time of flight method, wherein first sampling memory and second sampling memory have partially overlapping recording regions and each record a reception signal for a longer duration than a time interval between two successive transmission light pulses.

The sensor according to the invention determines distances by transmitting transmission light pulses, their reception after reflection or remission at an object, and evaluation of the pulse time of flight from a reception signal generated by the received light pulses. The invention starts from the basic idea to provide two sampling memories for the detection of the reception signal which have an enlarged unambiguity range and alternate with one another. There result partially overlapping recording regions each being longer than the time interval between two successive transmission light pulses. The alternating responsibility of the sampling memories means, in other words, that a sampling memory still records the reception signal beyond the transmission point in time of the subsequent transmission light pulse. Thus, late echoes from far objects are also recorded. Meanwhile, the other sampling memory is already active to detect early echoes of a near object with the new transmission light pulse.

The invention has the advantage that a higher range is achieved without adversely affecting the response time or the measuring repetition rate. The coupling of pulse repetition frequency and range is overcome and a measurement beyond the unambiguity range made possible. Alternatively, at least a portion of the increase in range can be sacrificed and instead the pulse repetition frequency be raised. Additional sampling memories with corresponding task distribution for even higher range or pulse repetition frequency are conceivable.

For a better understanding of the advantages according to the invention, it should be repeated at this point that conventionally the recording region can correspond at most to the unambiguity range determined by the pulse repetition frequency. Subsequently, in order to avoid gaps in the measurement, the reception signal of the new transmission light pulse has to be recorded. Range and pulse repetition frequency are therefore linked. The two sampling memories according to the invention should also not be confused with the two histogram memories of aforementioned WO 2012/084298 A1. There, the reception signal is strictly detected only within the unambiguity range. The two histogram memories are used to assign individual measurements to different groups in parallel.

The control and evaluation unit preferably is configured to transmit transmission light pulses repeatedly with a phase coding, wherein first sampling memory and second sampling memory are differently synchronized according to the phase coding of successive transmission light pulses. Throughout this specification, preferably refers to a preferred, but completely optional feature. The phase coding serves, among other things, to distribute regular interference so that it affects the reception signal at different points in time. A remitting object beyond the unambiguity range is, in a certain way, interference of this kind. The synchronization causes a far object to be recorded as a measuring effect in the responsible, synchronized sampling memory and as interference in the sampling memory which is unsynchronized and not responsible for that particular pulse. In particular, the sampling memories alternately synchronize to the phase coding of successive transmission light pulses.

The control and evaluation unit preferably is configured to transmit a plurality of successive transmission light pulses, to accumulate the reception signals recorded in the first sampling memory and the second memory in a histogram, and to determine the reception point in time from the histogram. This embodiment thus uses a multi-pulse method. In this case, the problem of the limited unambiguity range is particularly evident because of the large number of transmission light pulses. However, according to the invention, the coupling between unambiguity range and measurement range is overcome. A multi-pulse method is particularly effective when the sampling memories are synchronized to a phase coding as explained in the previous paragraph. Then, the echo from a far object is synchronized in one sampling memory and constructively builds up by accumulation, while in the other, unsynchronized memory where it would be falsely detected as a near object, the echo is jittered by the phase coding and thus eliminated as interference by averaging.

The control and evaluation unit preferably is configured to accumulate reception signals in the sampling memories. The sampling memories thus not only record the current reception signal, but a history of several reception signals, for example by adding the respective amplitude to the previous memory content. In order to obtain the histogram, data from the sampling memories preferably are combined into a histogram. As an alternative to accumulating directly in the sampling memories, there is at least one additional histogram memory wherein accumulation takes place, typically alternately from the two sampling memories.

Preferably, at least one A/D converter is provided in order to digitize reception signals for storing in the sampling memories. Reception signals may be stored as such, i.e. the digital values generated with the bit width of the A/D converter. The A/D converter preferably is only a binarizer. This is a very simple component, and the accumulation of histograms can be done by simple counters. As an alternative, there is neither merely a binarization nor a complete multi-bit sampling, but only amplitude states −1, 0, +1 are detected by two symmetrical thresholds, or more generally an odd number of amplitude states. For further explanation of this alternative, reference is made to EP 2 942 645 A1.

The sampling memories and the control and evaluation unit preferably are implemented on a common digital logic module, in particular an FPGA (Field Programmable Gate Array). This results in very low manufacturing costs and a particularly compact construction. An A/D converter can also be integrated on the digital module, in particular via comparators at its inputs.

A filter for converting the reception light pulse into a bipolar signal preferably is arranged downstream the light receiver. Light signals are always unipolar, because light incidence in the light receiver can only generate a positive signal. By means of a downstream filter, for example a bandpass filter or a differentiating element, wherein an oscillation is triggered by incident light, a bipolar signal is generated, wherein the reception point in time can be determined after A/D conversion by digital signal processing based on a zero crossing. This is considerably more precise than determination of the position of a peak, for example a maximum, because the zero crossing does not depend on the signal level and thus on transmission and ambient parameters. In addition, an echo from a far echo detected in the near range by the sampling memory which is not responsible is particularly effectively suppressed as a bipolar signal by phase coding and corresponding synchronization.

The sensor preferably is configured as a laser scanner having a movable deflection unit for periodically deflecting the transmission light pulses in the monitoring area. A laser scanner enables surface monitoring in a large monitoring area which is further extended by the range increase according to the invention. A laser scanner preferably comprises an angle measurement unit for generating angular position signals in dependence on an angular position of the deflection unit in order to two-dimensionally detect object positions or contours. A periodic deflection in an additional axis even enables 3D detection.

The sensor preferable comprises a safety output, wherein the control and evaluation unit is configured to detect an inadmissible intrusion into a protection field within the monitoring area and to output a safety-related shut down signal at the safety output in that case. The sensor thus can be used in safety applications. Examples are safety laser scanners or safe distance-measuring light grids.

The method according to the invention can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
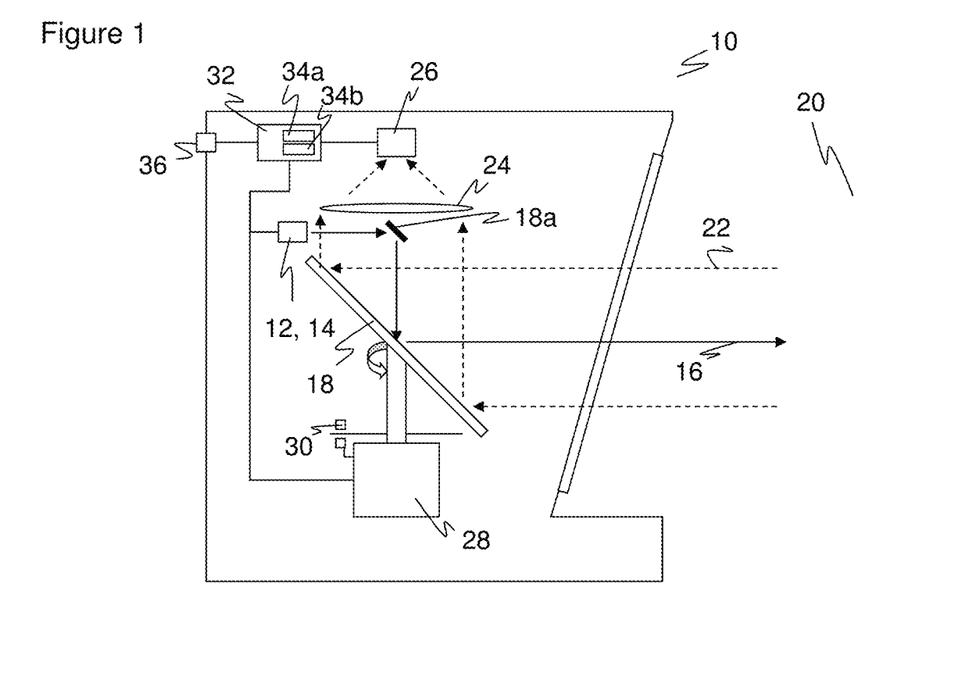
FIG. 1 a schematic sectional view of a laser scanner.

FIG. 1 shows a schematic sectional view through a laser scanner 10. The optical and constructional structure of the laser scanner 10 is only by way of example. Moreover, a laser scanner is a preferred example of a sensor according to the invention, but the invention it not limited to laser scanners, but can also be implemented in other sensors such as one-dimensional distance-measuring sensors.

A light transmitter 12, for example having a laser light source, generates a transmission light beam 16 by means of transmission optics 14. The transmission light beam 16 is transmitted into a monitoring area 20 via a deflection unit 18a, 18 and is remitted by an object. The remitted light 22 returns to the laser scanner 10 and is detected via the deflection unit 18 and by means of reception optics 24 in a light receiver 26, for example a photo diode or, for higher sensitivity, an avalanche photo diode (APD).

The deflection unit 18 is rotated by a motor 28 in a continuous rotational movement at a scan frequency. Therefore, the transmission light beam 16 scans a plane during each scan period, i.e. a complete revolution at the scan frequency. At the outer circumference of the deflection unit 18, an angle measuring unit 30 is arranged in order to detect the respective angular position of the deflection unit 18. Here, the angle measuring unit 30 is formed by a line coded disk as the angular measurement body and a forked light barrier for its detection by way of example.

An evaluation unit 32 is connected to the light transmitter 12, the light receiver 26, the motor 28 and the angle measuring unit 30. In two sampling memories 34a-b, which may or may not be part of the evaluation unit 32, digitized reception signals of the light receiver 26 are stored in a manner to be explained in more detail below with reference to FIGS. 2 to 5. The evaluation unit 32 measures the light time of flight between transmitting the transmission light beam 16 and receiving the remitted light 22 in order to obtain the distance of a scanned object from the laser scanner 10 using the speed of light. The respective angular position where the transmission light beam 16 was transmitted is known to the evaluation unit 32 from the angle measuring unit 30.

Thus, after each scanning period, with angle and distance, two-dimensional polar coordinates of all object positions in the monitoring area 20 are available. Therefore, the object positions or object contours, respectively, are known and can be communicated via an interface 36 or be displayed at the laser scanner 10. The interface 36 can also be used as a parametrization interface where data can be transferred to the evaluation unit 32. As an alternative, a separate parameterization interface is provided. For applications in safety technology, the interface 36 can be configured in a safe manner, in particular as a safe output (OSSD, Output Signal Switching Device) for a safety-related shutdown signal upon detection of an intrusion into a protective field.

Figure 2:
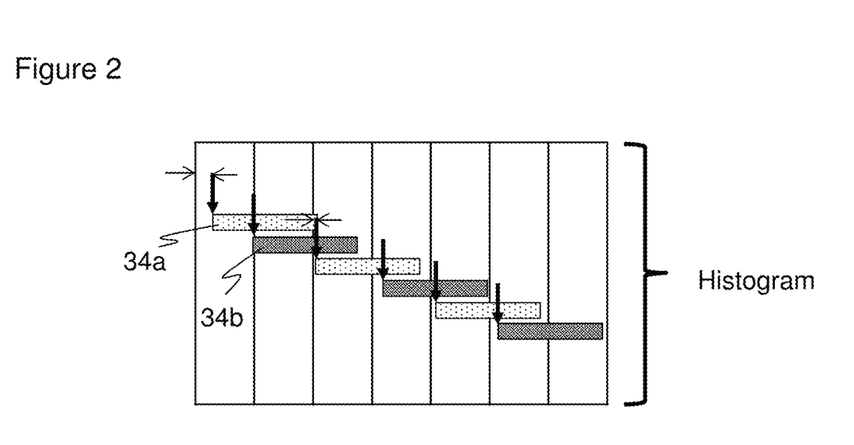
FIG. 2 a schematic representation of the alternating, partially overlapping detection of reception signals in two sampling memories.

FIG. 2 is a schematic representation for explaining an alternating partially overlapping detection of reception signals in the two sampling memories 34a-b. The length of the bars in FIG. 2 symbolizes the time interval within which the reception signal is recorded in the respective sampling memory 34a-b. The lines of the regular vertical grid represent a regular transmission pulse frequency. The actual transmission points in time when successive transmission light pulses are transmitted by the transmission light beam 16 are offset with respect to that grid according to a preferably pseudo-random phase coding and are thus not temporally equidistant, as also illustrated by horizontal arrows. The recording regions of the sampling memories 34a-b are alternately synchronized to every other transmission light pulse taking into account the phase coding. In addition, the recording regions are extended beyond the unambiguity range, the latter corresponding to the distance between two vertical lines and thus the repetition period of the transmission light pulses. The maximum possible extension and thus range increase is twice the original unambiguity range without taking into account the phase coding, because afterwards the respective sampling memory 34a-b is again responsible for a later transmission light pulse. However, this limitation can be overcome if necessary by additional sampling memories.

The reception signals in the sampling memories 34a-b can directly be evaluated for a light time of flight after detection. Preferably, a plurality of reception signals is added or averaged, and only the resulting histogram is evaluated. This results in a significant improvement of the signal-to-noise ratio. A possible histogram evaluation is explained below with reference to FIGS. 6 and 7.

The effects of the detection of reception signals in two sampling memories 34a-b according to FIG. 2 will now be illustrated with reference to FIGS. 3 to 5. Numerical values will be used for illustration, which of course are to be understood as purely exemplary.

Figure 3:
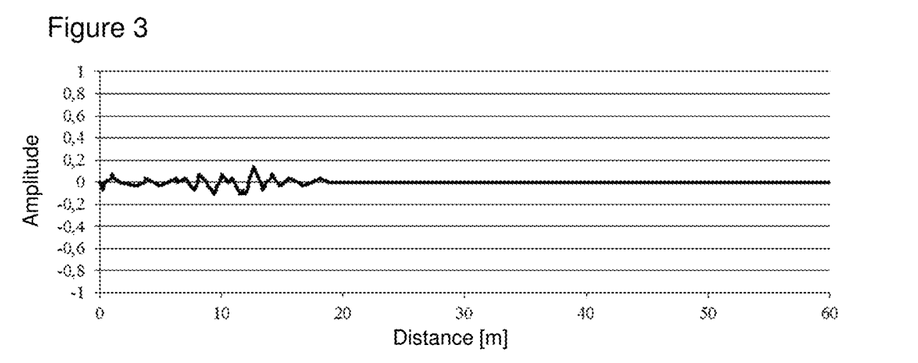
FIG. 3 an exemplary course of a reception signal within the unambiguity range.

FIG. 3 shows, for comparison, an amplitude profile of a reception signal in dependence on the distance, which in turn is proportional to the light time of flight, for a conventional method having only one sampling memory whose recording region at most is as large as that of the unambiguity range. At a pulse repetition frequency of the transmission light pulses of 2 MHz, the unambiguity range is approximately 75 m, since light needs about 1/(2 MHz) to travel that distance on the return path. In case of phase encoding with a phase shift of 10%, the unambiguity range is reduced to approximately 67.5 m.

An object at a greater distance, in this example 80 m, is no longer detected within the unambiguity range. An echo from this far object reaches the laser scanner 10 only after the sampling memory already is synchronized to the next transmission light pulse. When averaging reception signals of a plurality of transmission light pulses, the lacking synchronization of wrong phase coding has the effect that the echo of the far object does not add up to an evaluable peak, i.e. is constructively superimposed, but rather is suppressed by the jittering according to the phase coding. This is why in FIG. 3 there is only kind of an interference signal in the initial range, namely, the cross-talk of the respective previous individual measurement attenuated by averaging as just explained.

The phase coding (dithering) thus ensures robustness against wrong detections of an object in the near range which actually does not exist. However, this also suppresses any measurement information about the object at the distance of 80 m. The conventional single sampling memory cannot acquire measurement information beyond the unambiguity range.

Figure 4:
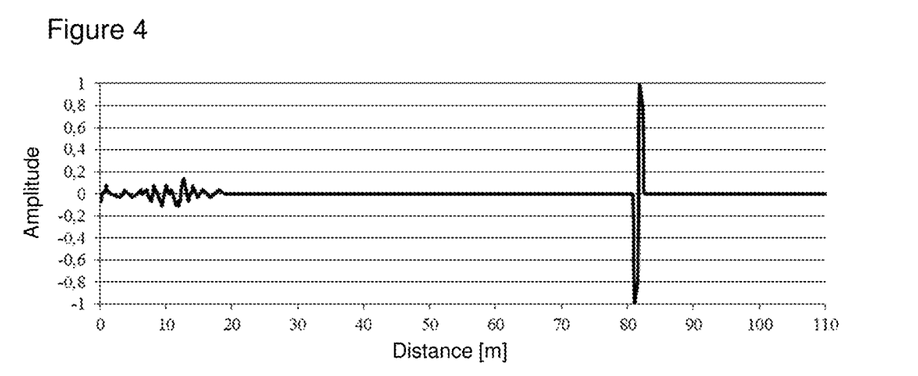
FIG. 4 an exemplary course of a reception signal with detection in two sampling memories according to the invention for a far object.

FIG. 4 shows a corresponding amplitude profile of the reception signal when using two sampling memories 34a-b according to the invention as in FIG. 2. When the echo of the far object at 80 m is received, the respective responsible sampling memory 34a-b is still synchronized to the associated transmission light pulse. The recording continues beyond the unambiguity range. Due to the correct synchronization, there is a pronounced peak for the object at 80 m after averaging. The measuring range is no longer limited to the unambiguity range.

While the one sampling memory 34a-b still waits for echoes from a distance beyond 75 m, the other sampling memory 34b-a already starts to detect echoes of the subsequent transmission light pulse from 0 m. The object at 80 m is also detected in the other sampling memory 34b-a, but in the near range, i.e. at 80 m (actual distance)−75 m (unambiguity range)=5 m (apparent distance). However, since the other sampling memory 34b-a is synchronized to the subsequent transmission light pulse, it has a different phase offset corresponding to the phase coding. Therefore, similar to the situation in FIG. 3, the apparent object detection in the near range is jittered and thus suppressed by averaging, which is clearly visible in FIG. 4. It should be kept in mind that responsible sampling memory 34a-b and other memory 34b-a are not fixed, but preferably swap roles with the successive transmission light pulses as illustrated in FIG. 2.

Figure 5:
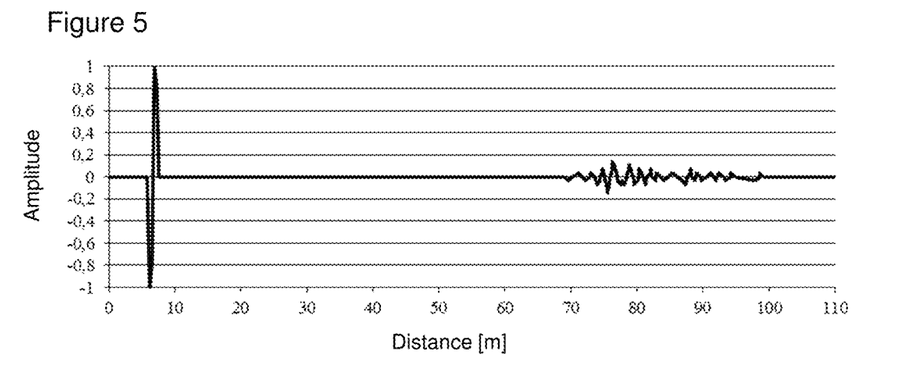
FIG. 5 an exemplary course of a reception signal with detection in two sampling memories according to the invention for a near object.

FIG. 5 illustrates the inverse case of a near object at a distance of 5 m. In the responsible sampling memory 34a-b, i.e. the one synchronized to the associated transmission light pulse, the near echo is detected at the beginning within the unambiguity range as a pronounced peak. In the other sampling memory 34b-a, this leads to a cross-talk at a respective distance modulo the unambiguity range, i.e. in this example at 80 m, which is strongly suppressed due to the phase coding and averaging in analogy with the explanations with reference to FIG. 4.

An exemplary multi-pulse method for light time of flight measurement will now be explained with reference to FIGS. 6 and 7. The multi-pulse method in itself is in principle known for one-dimensional distance sensors from EP 1 972 961 A1 mentioned in the introduction which is a reference for further explanations. The principle of range extension is very useful in this context, but the invention is not limited to this particular multi-pulse method, and in fact not even to multi-pulse methods as such.

Figure 6:
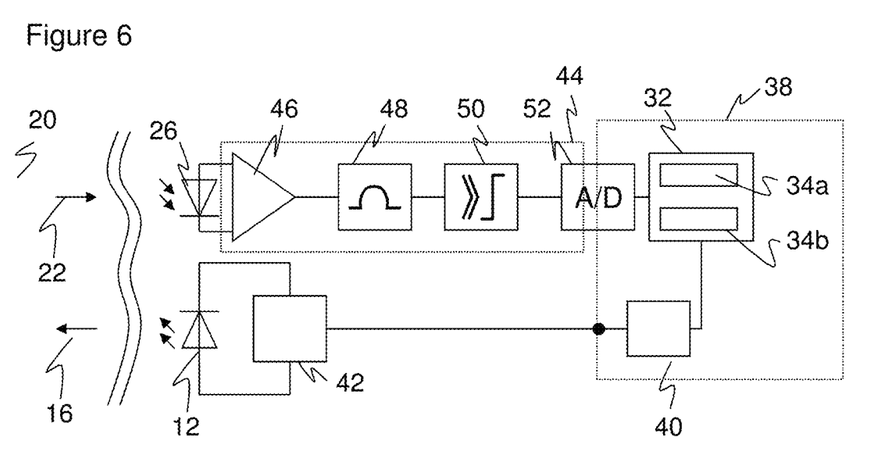
FIG. 6 a block diagram of an analog signal preprocessing and a digital evaluation for distance measurement with a light time of flight method.

As shown in FIG. 6, the evaluation unit 32 and the sampling memories 34a-are preferably implemented on a digital device 38, for example an FPGA (Field Programmable Gate Array). In a transmission path, the evaluation unit 32 initiates the transmission of transmission light pulses at clearly defined points in time via a delay unit 40 and a laser drive circuit 42. The delay unit 40 may be implemented by registers, counters and the like of the FPGA.

The remitted light 22 of an transmission light pulse is converted into a reception pulse by the light receiver 26 and is supplied to the evaluation unit 32 via an analog preprocessor 44 having a preamplifier 46, a filter 48 and a limiting amplifier 50, as well as an A/D converter 52. Preamplifier 46 and filter 48 may also be arranged in reverse order.

Figure 7:
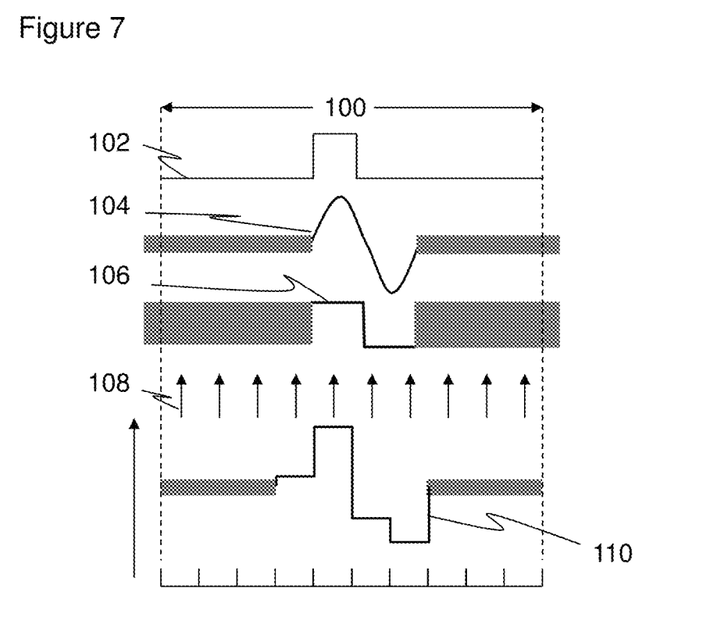
FIG. 7 a representation of the signals in different processing stages of the preprocessing and evaluation according to FIG. 6.

The resulting signals in the various intermediate steps are shown in FIG. 7. The light transmitter 12 generates a respective transmission light pulse in each measurement period 100. The phase coding is not shown in FIG. 7. The transmission light pulse is reflected or remitted in the monitoring area 20 and subsequently converted into an electrical reception pulse 102 by the light receiver 26, and afterwards is amplified in preamplifier 46 for example being a transimpedance amplifier. The reception pulse 102 is shown in an idealized manner, under realistic conditions noise and shape distortions would be added.

Due to the nature of light, the reception pulse 102 always is a unipolar signal. In the filter 48, for example a band pass filter, it is converted into a bipolar signal 104, of which only the first two oscillations are shown. At the sides of the actual bipolar signal 104, gray rectangles symbolize a noise level. In the limiting amplifier 50, the bipolar signal 104 is amplified into saturation and cut off, so that the actual signal becomes a rectangular flank 106 and the noise level represented by gray rectangles is stretched in its amplitude over the entire dynamical range.

The rectangular flank 106 is sampled in A/D converter 52 preferably being configured as a binarizer. Each support point of the sampling is symbolized by an arrow 108. The resulting bit sequence is used in the evaluation unit 32 to form a histogram 110. For each bin, an accumulator is provided which is only increased for an associated bit value "1". For ideal signals without noise, in the histogram 110 only bins would be filled where the rectangular flank 106 is positioned. However, the noise level increased by limiting amplifier 50 also fills the other bins, namely, in the expectation value in about each second measurement period 100 due to the randomness of the noise.

In case the method described so far is iterated and the histogram 110 formed over n measurement periods 100, the bins are approximately filled with the value n/2 due to the noise, with added statistical fluctuations. Because of the binarization, this value n/2 corresponds to a signal value zero. From that background, the maximum formed by the positive part of the bipolar signal 104 is raised upwards, and correspondingly the minimum projects downwards. The intermediate zero-crossing is detected by the evaluation unit 32 in order to detect the reception point in time regardless of the signal level.

The statistical evaluation of a large number of individual measurements increases the signal-to-noise ratio to such an extent that robust distance measurements are possible even in the event of difficult ambient conditions. This is also true if a single amplified reception pulse 102 has a noise level where no differences between the useful signal and the noise can be detected.

The invention claimed is:

1. A time of flight distance-measuring optoelectronic sensor (10) for detection and distance-determination of objects in a monitoring zone (20), the sensor (10) comprising:
   a light transmitter (12) for transmitting a transmission light pulse (16) into the monitoring zone (20),
   a light receiver (26) for generating a reception signal from the light pulse (22) remitted or reflected by objects in the monitoring zone (20),
   a control and evaluation unit (32) configured to determine a reception point in time from the reception signal and, from that, the distance of the object by means of a light time of flight method measured by a pulse method using the reception signal from the light pulse (22) remitted or reflected by objects in the monitoring zone (20),
   a first sampling memory (34a) having a plurality of memory cells each for storing a section of the reception signal, and
   at least a second sampling memory (34b) having a plurality of memory cells each for storing a section of the reception signal,
   wherein first sampling memory (34a) and second sampling memory (34b) have partially overlapping recording regions and are each configured to alternately record the reception signal for a longer duration than a time interval between two successive transmission light pulses (16) so that the first sampling memory (34a) records the reception signal beyond the transmission point in time of the subsequent transmission light pulse (16) in order to also detect late echoes from far objects while the second sampling memory (34b) already is active in order to detect early echoes from a near object by means of the new transmission light pulse.

2. The sensor (10) according to claim 1, wherein the control and evaluation unit (32) is configured to transmit transmission light pulses (16) repeatedly with a phase coding, and wherein first sampling memory (34a) and second sampling memory (34b) are differently synchronized according to the phase coding of successive transmission light pulses (16).

3. The sensor (10) according to claim 1, wherein the control and evaluation unit (32) is configured to transmit a plurality of successive transmission light pulses (16), to accumulate the reception signals recorded in the first sampling memory (34a) and the second memory (34b) in a histogram, and to determine the reception point in time from the histogram.

4. The sensor (10) according to claim 2, wherein the control and evaluation unit (32) is configured to accumulate reception signals in the sampling memories (34a b).

5. The sensor (10) according to claim 1, wherein at least one A/D converter (52) is provided in order to digitize reception signals for storing in the sampling memories (34a b).

6. The sensor (10) according to claim 1, wherein the sampling memories (34a b) and the control and evaluation unit (32) are implemented on a common digital logic module.

7. The sensor (10) according to claim 6, wherein the common digital logic module is an FPGA (Field Programmable Gate Array).

8. The sensor (10) according to claim 1, wherein a filter (48) for converting the reception signal from the light pulse into a bipolar signal (104) is arranged downstream the light receiver (26).

9. The sensor (10) according to claim 1, which is configured as a laser scanner having a movable deflection unit (18) for periodically deflecting the transmission light pulses (16) in the monitoring zone (20).

10. The sensor (10) according to claim 1, comprising a safety output (36), and wherein the control and evaluation unit (32) is configured to detect an inadmissible intrusion into a protection field within the monitoring zone (20) and to output a safety-related shut down signal at the safety output (36) in that case.

11. A method for detection and distance-determination of objects in a monitoring zone (20) according to a time of flight method, the method comprising the steps of:
   transmitting transmission light pulses (16) into the monitoring zone (20),
   generating a respective reception signal from the light pulses (22) remitted or reflected by objects in the monitoring zone (20),
   storing sections of the reception signal in a first sampling memory (34a) having a plurality of memory cells,
   storing sections of the reception signal in at least a second sampling memory (34b) having a plurality of memory cells,
   evaluating the reception signal to determine a reception point in time and, from that, the distance of the object by means of a light time of flight method, measured by a pulse method using the reception signal from the light pulse (22) remitted or reflected by objects in the monitoring zone (20),
   wherein first sampling memory (34a) and second sampling memory (34b) have partially overlapping recording regions and each alternately record the reception signal for a longer duration than a time interval between two successive transmission light pulses (16) so that the first sampling memory (34a) records the reception signal beyond the transmission point in time of the subsequent transmission light pulse (16) in order to also detect late echoes from far objects while the second sampling memory (34b) already is active in order to detect early echoes from a near object by means of the new transmission light pulse.

12. The method according to claim 11, wherein transmission light pulses (16) are transmitted repeatedly with a phase coding, and wherein first sampling memory (34a) and second sampling memory (34b) are alternately synchronized to the phase coding of successive transmission light pulses (16).

13. The method according to claim 11, wherein a plurality of successive transmission light pulses (16) is transmitted, the reception signals recorded in the first sampling memory (34a) and the second memory (34b) are accumulated in a histogram, and the reception point in time is determined from the histogram.

14. The method according to claim 12,
wherein the reception signals are at least partially accumulated in the sampling memories (34a b).

15. The method according to claim 11,
wherein the transmission light pulses (16) are periodically deflected in the monitoring zone (20) by means of a movable deflection unit (18).

16. The method according to claim 11,
wherein an inadmissible intrusion into a protection field is detected within the monitoring zone (20), and wherein in that case a safety-related shut down signal is output.

* * * * *